(12) United States Patent
Tench et al.

(10) Patent No.: US 7,317,566 B2
(45) Date of Patent: Jan. 8, 2008

(54) ELECTRODE WITH TRANSPARENT SERIES RESISTANCE FOR UNIFORM SWITCHING OF OPTICAL MODULATION DEVICES

(75) Inventors: D. Morgan Tench, Camarillo, CA (US); Michael A. Cunningham, Thousand Oaks, CA (US); Paul H. Kobrin, Newbury Park, CA (US)

(73) Assignee: Teledyne Licensing, LLC, Thousand Oaks, CA (US)

( * ) Notice: Subject to any disclaimer, the term of this patent is extended or adjusted under 35 U.S.C. 154(b) by 75 days.

(21) Appl. No.: 11/162,106

(22) Filed: Aug. 29, 2005

(65) Prior Publication Data

US 2007/0053046 A1    Mar. 8, 2007

(51) Int. Cl.
 G02F 1/15     (2006.01)
 G02F 1/153    (2006.01)
 G02F 1/00     (2006.01)
 H01L 21/00    (2006.01)

(52) U.S. Cl. .............. 359/265; 359/267; 359/269; 359/271; 359/273; 359/275; 359/321; 438/57; 438/63; 349/85; 349/106; 250/214 LA; 204/290.14

(58) Field of Classification Search ........ 359/265–275, 359/321; 204/290.07, 290.14, 291, 266; 250/214 LA; 349/85, 86, 106, 147; 438/57, 438/63, 84, 86; 428/323, 432, 34, 472
See application file for complete search history.

(56) References Cited

U.S. PATENT DOCUMENTS

| | | | | |
|---|---|---|---|---|
| 3,589,896 A | * | 6/1971 | Wilcox | 359/321 |
| 3,644,741 A | * | 2/1972 | Ovshinsky | 250/214 LA |
| 4,548,889 A | * | 10/1985 | Nemoto et al. | 430/270.11 |
| 4,729,970 A | * | 3/1988 | Nath et al. | 438/4 |
| 4,815,823 A | * | 3/1989 | Kaneko | 349/85 |
| 4,960,323 A | * | 10/1990 | Demiryont | 359/275 |
| 5,189,550 A | * | 2/1993 | Goldner et al. | 359/273 |
| 5,598,293 A | * | 1/1997 | Green | 359/275 |
| 5,768,004 A | * | 6/1998 | Cogan | 359/269 |
| 5,903,382 A | | 5/1999 | Tench et al. | 359/265 |
| 5,923,456 A | | 7/1999 | Tench et al. | 359/266 |
| 6,048,621 A | * | 4/2000 | Gallego et al. | 428/432 |
| 6,301,039 B1 | | 10/2001 | Tench | 359/267 |
| 6,803,028 B2 | * | 10/2004 | Gadkaree et al. | 423/594.8 |
| 6,913,943 B2 | * | 7/2005 | Cunningham et al. | 438/57 |
| 2004/0020767 A1 | | 2/2004 | Tench | |

OTHER PUBLICATIONS

PCT International Search Report; Mar. 13, 2007; 5 pps.; in International Application No. PCT/US06/30748.
PCT Written Opinion of the International Searching Authority; Mar. 13, 2007; 3 pps.; in International Application No. PCT/US06/30748.

\* cited by examiner

*Primary Examiner*—Loha Ben
(74) *Attorney, Agent, or Firm*—Koppel, Patrick, Heybl & Dawson (57) ABSTRACT

Switching uniformity of an optical modulation device for controlling the propagation of electromagnetic radiation is improved by use of an electrode comprising an electrically resistive layer that is transparent to the radiation. The resistive layer is preferably an innerlayer of a wide-bandgap oxide sandwiched between layers of indium tin oxide or another transparent conductor, and may be of uniform thickness, or may be graded so as to provide further improvement in the switching uniformity. The electrode may be used with electrochromic and reversible electrochemical mirror (REM) smart window devices, as well as display devices based on various technologies.

32 Claims, 6 Drawing Sheets

(A)

| 204 |
|---|
| 203 |
| 202 |
| 201 |

ELECTRODE WITH TRANSPARENT SERIES RESISTANCE FOR UNIFORM SWITCHING OF OPTICAL MODULATION DEVICES

GOVERNMENT RIGHTS

This invention was made with Government support under Contract No. DE-FC26-03NT41951 awarded by the Department of Energy. The Government has certain rights in this invention.

CROSS-REFERENCE TO RELATED APPLICATIONS

This application is related to U.S. Pat. Nos. 5,903, 382; 5,923,456; 6,111,685; 6,166,847; 6,256,135; 6,301,039; 6,400,491; 6,552,843; 6,721,080 and 6,798,556; and to U.S. patent application, Ser. No. 10/211,494, filed Aug. 1, 2002 (entitled "Locally-Distributed Electrode and Method of Fabrication"), now U.S. Pat. No. 7,022,210, all of which are assigned to the assignee of the present application. The teaching of each of these patents and patent applications is incorporated herein by reference.

1. Field of the Invention

This invention is concerned with devices, such as smart windows and optical attenuators, for controlling the propagation of electromagnetic radiation.

2. Description of the Related Art

Smart windows are designed to reduce the amount of energy consumed for climate control of buildings and transportation vehicles by controlling the amount of solar radiation that is transmitted into such buildings and vehicles, which produces interior heating via the greenhouse effect. However, the electrochromic smart window devices which are known in the prior art have narrow dynamic ranges and involve light absorption during operation, resulting in heat being generated and transferred into the interior space by conduction, convection and infrared radiation. In addition, electrochromic devices typically utilize a relatively slow ion insertion electrochemical process that limits switching speed and cycle life. Heating of electrochromic devices by light absorption further reduces the device lifetime. Other types of smart windows, such as liquid crystal and suspended particle devices, also have limited dynamic range and typically have the added disadvantage of requiring a continuously applied voltage to maintain a given transmissive state. Consequently, an important need exists for a durable, low-power smart window with reflectivity variable over a wide range. A smart window device based on light reflection would be much more efficient at preventing interior heating.

U.S. Pat. Nos. 5,923,456 and 5,903,382 to Tench et al. describe a reversible electrochemical mirror (REM) smart window device that provides the adjustable light reflection, wide dynamic range, long cycle life and low power requirements needed for a high efficiency smart window. In a transmissive type REM device, a mirror metal is reversibly electrodeposited (from a thin layer of liquid or gelled electrolyte) on a transparent electrode to form a full or partial mirror, which provides variable reflectivity. Conversely, the mirror metal is deposited on a locally distributed counter electrode (a metallic grid on glass, for example) to reduce the reflectivity and increase the amount of light transmitted. The mirror metal is preferably silver but may be another metal, such as bismuth, copper, tin, cadmium, mercury, indium, lead, antimony, thallium, zinc, or an alloy. The transparent electrode is typically indium tin oxide (ITO) or fluorine-doped tin oxide (FTO), with a thin layer of noble metal (e.g., 15 Å platinum) that serves as a nucleation layer so that suitably smooth, mirror deposits can be obtained. The transmission of visible light, with continuous variability from around 80% to complete blocking, has been demonstrated and higher transmission for some device configurations and switching conditions should be attainable. Intermediate mirror states provide good visibility and have a pleasing bluish-gray appearance. Very little voltage is required for switching REM devices, and no voltage is needed to maintain a given switched state. As described in U.S. Pat. No. 6,301,039 to Tench, the decrease in mirror electrode sheet resistance produced by deposition of mirror metal on the mirror electrode can be used to monitor the reflectance state of the REM mirror.

Commercialization of REM smart window devices has been hindered by the expense and performance of the locally distributed counter electrode, which must present a relatively small cross-sectional area to avoid excessive light blockage that would decrease the maximum transmission of the device. One counter electrode approach, described in U.S. Pat. No. 5,903,382 to Tench et al., is to use a grid of a noble metal (platinum with a chromium adhesion layer, for example) that is vacuum evaporated through a photolithographic mask onto a glass substrate. The photolithographic process is inherently expensive and not readily scalable to large areas. In addition, fine grid lines (<10 μm wide) are needed so as to be invisible to the eye, but grid lines of such size are prone to damage during the photoresist liftoff process, which further increases the fabrication costs. Fine grid lines also tend to produce light interference patterns that can distort images seen through the window. Furthermore, grid lines, even with mirror metal deposited on them, are relatively flat so that their actual area and cross-sectional area are nearly the same. Consequently, the current carrying capability for such grids with good light transmission is very low (approximately 5-10% of that for the mirror electrode).

An alternative approach for transmissive devices is to use the dot matrix counter electrode described in U.S. patent application Ser. No. 10/211,494 to Tench (filed Aug. 1, 2002), which is assigned to the same assignee as the present invention. Such an electrode comprises microscopic islands of a noble metal (e.g., Pt) distributed over a layer of a transparent metallic oxide conductor (e.g., ITO or FTO), which serves as the current collector. During device operation, mirror metal is reversibly deposited on the noble metal islands, which are produced by electrodeposition at active sites on the transparent conductor surface (without photolithography). Extraneous mirror metal deposition is inhibited since the potential required for mirror metal deposition on the bare metallic oxide surface is generally greater than on the noble metal islands. For spherical islands, the surface area is roughly three times the cross-sectional area and the current carrying capability is further increased via spherical diffusion. Sufficiently small islands are not visible to the naked eye.

One undesirable feature of electrochemical optical modulation devices, such as REM and electrochromic devices, is that switching generally tends to occur more rapidly at the edges of the device, producing an iris pattern. Such "irising" results from decreased voltage between the electrodes toward the center of the device (away from the buss bars) due to the voltage drop associated with the electrode sheet resistances. For some electrochromic systems, iris patterns tend to dissipate with time at open circuit due to chemical reactions that occur laterally along the switched electrode surface, but irising during the switching operation is still undesirable. For REM devices, iris patterns resulting from non-uniform switching do not readily dissipate with time.

One prior art approach for reducing irising of electrochemical optical modulation devices is to decrease the sheet resistances of the electrodes. The utility of this approach is limited by the requirement that at least one of the electrodes be transparent to the radiation to be modulated. The indium tin oxide (ITO) films generally used for optically transparent electrodes have sheet resistances of 10-20 ohm/square, which typically results in appreciable irising, especially for large-area devices. For REM devices, the sheet resistance of the mirror electrode is greatly reduced by the layer of mirror metal deposited during switching so that irising is minimal for reflective devices employing a metallic counter electrode. For transmissive REM devices, however, irising is a significant issue, especially for devices employing a dot matrix counter electrode with a conducting oxide current collector.

Another prior art approach for reducing irising of electrochemical optical modulation devices is to increase the resistance of the electrolyte so that the voltage drop between the electrodes is large compared to the voltage drops associated with the sheet resistances along the electrodes. Use of a large inter-electrode spacing effectively increases the electrolyte resistance but typically entails unacceptable increases in the volume of the electrolyte (which is often expensive) and the weight and size of the device. Gelled electrolytes could also be used but those exhibiting high resistivity tend to also have low current carrying capability due to low ion mobilities. Low current carrying capability often affects both the switching speed and the quality of the optical modulation. In addition, gelled electrolytes are often environmentally unstable, and gelling agents may directly interfere with electrochemical reactions involved in optical modulation.

A practical approach for improving the switching uniformity of electrochemical optical modulation devices with small inter-electrode spacings is needed. Such an approach would be particularly useful for minimizing irising of smart window devices, but would also be useful for display devices. Ideally, the approach would be applicable to optical modulation devices based on a variety of technologies.

SUMMARY OF THE INVENTION

The invention provides an electrode for use in an optical modulation device to improve the switching uniformity of the device. The electrode comprises a resistive layer of a material that has high electrical resistivity and is substantially transparent to the radiation whose propagation is to be controlled. The resistive layer material is preferably a wide-bandgap metallic oxide, aluminum oxide (Al2O3) or titanium oxide (TiO2), for example. The resistive layer is deposed on a layer of a transparent electrical conductor, indium tin oxide (ITO) or fluorine doped tin oxide (FTO), for example, on a transparent glass or plastic substrate. The electrode may further comprise a surface modification layer, deposited as an overlayer on the resistive layer, to provide a desirable property not possessed by the resistive innerlayer material. One or more additional surface modification layers, deposited on other surface modification layers, may also be used. The layers of the electrode may be continuous, or one or more of the electrode layers may be patterned, for use in a display device, for example. The various layers of the electrode are preferably deposited by sputtering but may be deposited by any suitable method, including electron-beam deposition, chemical vapor deposition (CVD), spray pyrolysis, sol-gel processing, thermal evaporation, and combinations thereof. Electrical contact is generally provided along at least one side of the electrode by bus bars, comprising conducting epoxy, metallic strips with conducting adhesive, or metallic clips, for example.

In one embodiment, the resistive layer within the electrode is of substantially uniform thickness and composition and improves the switching uniformity of the device by increasing the effective resistance between the electrodes, via the cross-film resistance of the resistive layer, so that the effects of the electrode sheet resistances on the inter-electrode voltage distribution are reduced. Preferably, the thickness and composition of the resistive layer are selected to provide the highest cross-film resistance compatible with the required optical and switching characteristics of the device. In particular, an excessively thick resistive layer may significantly reduce the maximum optical transmission of the device and/or unacceptably increase the voltage required for switching.

In another embodiment, the thickness of the resistive layer is graded to provide further improvement in the switching uniformity. Generally, the resistive layer should be thickest near the bus bars at the edge of the device and thinnest near the center of the device. The taper of the resistive layer profile may be constant (linear cross-section) or varied. Electrical circuit modeling may be used to determine the resistive layer thickness profile providing optimum switching uniformity, taking into account the type of optical modulation device, the device shape and dimensions, electrode characteristics, and the placement of bus bars. For rectangular devices, bus bars on all four sides of each electrode tend to produce faster switching in the corners of the device and should be avoided. Preferred bus bar configurations for rectangular devices are two bus bars on opposite sides of each electrode, or one bus bar on each electrode (on opposite sides of the device).

The invention further provides a reversible electrochemical mirror (REM) device employing at least one electrode with a resistive innerlayer to improve switching uniformity of the device. The resistive electrode innerlayer is preferably incorporated in a dot matrix counter electrode, but may also be incorporated in a mirror electrode or in both electrodes of the device. In a preferred embodiment, the REM counter electrode is a dot matrix electrode comprising an underlayer of conductive ITO or FTO (preferably 10-20 ohms/square) on a glass or plastic substrate, an innerlayer of a wide-bandgap metallic oxide ($Al_2O_3$ or $SiO_2$ or $TiO_2$, for example), and a thin overlayer of ITO or FTO (preferably 100-500 Å thick) with a dot matrix of platinum spheroids deposited thereupon.

A preferred REM device according to the invention comprises an electrolyte containing ions of an electrodepositable metal (e.g., Ag, Cu or Bi) disposed between and in contact with a mirror electrode and a dot matrix electrode comprising a resistive innerlayer, as described in the preceding paragraph. The electrolyte may be an aqueous electrolyte, a nonaqueous electrolyte, or an ionic liquid electrolyte. The mirror electrode preferably comprises a thin layer of a noble metal (e.g., 15-25Å sputtered Pt) on a layer of a transparent conductor (e.g., 10-20 ohms/square ITO or FTO) on a glass or plastic substrate. The preferred device further comprises a charge of the electrodepositable metal, which may initially subsist on the mirror electrode or the dot matrix electrode, or be apportioned between the two electrodes. Such electrochemical optical modulation devices will generally also comprise an edge seal for containing the electrolyte and preventing intrusion of oxygen and water, and bus bars along at least one edge of each electrode.

Switching of this preferred REM device involves application of a voltage between the two electrodes. Application of a negative voltage to the mirror electrode relative to the dot matrix electrode tends to cause the electrodepositable metal to dissolve from the dot matrix electrode and to deposit as a mirror layer on the mirror electrode, increasing the reflectance and decreasing the transmission of the device for electromagnetic radiation. Application of a positive voltage to the mirror electrode tends to cause the electrodepositable metal to deposit on the noble metal spheroids of the dot matrix electrode and to dissolve from the mirror electrode, decreasing the reflectance and increasing the transmission of the device. Voltage losses associated with electrode sheet resistances tend to reduce the inter-electrode voltage at locations away from the bus bars, resulting in thinner mirror layers and reduced optical reflectance toward the center of the device. This effect is reduced by the cross-film resistance of the resistive innerlayer, which is electrically in series with the constituent elements of the electrode sheet resistances. For a sufficiently large cross-film resistance, voltage losses associated with the electrode sheet resistances are relatively small so that mirror layer deposits, and the associated reflectance, are substantially uniform across the device.

The electrode of the invention provides improved switching uniformity for optical modulation devices. It is particularly useful for large-area devices, such as smart windows, but may also be used with other optical modulation devices, including display devices and beam steering devices, including optical shutters. The invention may be applied to optical modulation devices based on various technologies, including reversible metal electrodeposition, electrochromics, organic light emitting diodes, suspended particles, and liquid crystals.

Further features and advantages of the invention will be apparent to those skilled in the art from the following detailed description, taken together with the accompanying drawings.

BRIEF DESCRIPTION OF THE DRAWINGS

These figures are not to scale and some features have been enlarged for better depiction of the features and operation of the invention.

DETAILED DESCRIPTION OF THE INVENTION

Technical terms used in this document are generally known to those skilled in the art. The terms "conductive" and "resistive" refer to the electrical conductivity and electrical resistivity of a material. The term "transparent" is used to denote substantial transmission of the electromagnetic radiation whose propagation is controlled by the optical modulation device. The term "electrode potential", or simply "potential", refers to the voltage occurring across a single electrode-electrolyte interface. The potential of a working electrode is typically controlled relative to the potential of a reference electrode via a potentiostat, which passes current between the working electrode and a counter electrode. A "cyclic voltammogram" is a plot of current or current density (on the y-axis) versus the working electrode potential (on the x-axis) typically obtained by cycling the working electrode potential with time between fixed negative and positive limits. As the term is used in this document, a noble metal is one that does not dissolve or passivate in the electrolyte in which it is utilized as an electrode in practicing the invention. In REM devices, silver is not a noble metal since it is reversibly electrodeposited and dissolved in the electrolyte during operation of the device. The symbol "M" means molar concentration.

Figure 1:
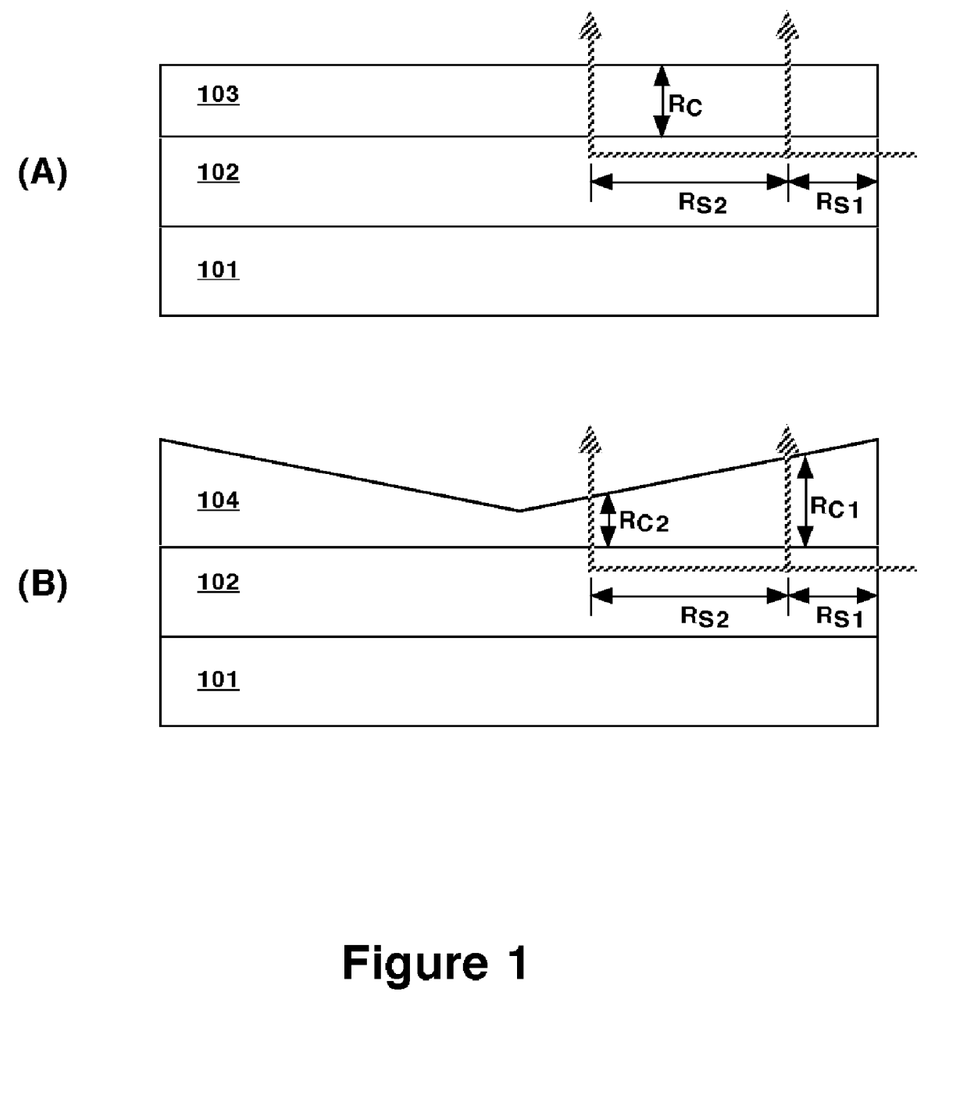
FIG. 1 illustrates current flow paths (broken arrows) for electrodes having (A) a resistive layer of uniform thickness and (B) a resistive layer of graded thickness.

The invention provides an electrode that is useful for improving the switching uniformity of a variety of optical modulation devices. The electrode comprises a layer of a transparent conductive material deposited on a transparent substrate, an innerlayer of a transparent resistive material deposited on the layer of the transparent conductive material, and a surface modification layer deposited on the layer of the transparent resistive material. The electrode may further comprise one or more additional surface modification layers deposited on other surface modification layers FIG. 1(A) depicts an electrode, according to the invention, comprising a substrate 101, a conductive layer 102, and a resistive layer 103 of uniform thickness. The broken arrows indicate current flow from the edge of the electrode, along conductive layer 102, and across resistive layer 103. As current flows toward the center of the electrode, the voltage is reduced by the ohmic losses associated with sheet resistances RS1 and RS2 of conductive layer 102, which tends to cause the current distribution along the electrode to be nonuniform. However, cross-layer resistance RC across resistive layer 103 is electrically in series with all other resistive elements of the electrode, and tends to reduce the effects of the sheet resistance of conductive layer 102 on the current distribution. A sufficiently high resistance RC relative to sheet resistance of conductive layer 102 provides a more uniform current distribution and improved device switching uniformity.

FIG. 1(B) depicts an electrode comprising a substrate 101, a conductive layer 102, and a resistive layer 104 whose thickness is graded so as to decrease toward the center of the electrode. In this embodiment of the invention, higher cross-layer resistance $R_{C1}$ for resistive layer 104 near the edge of the electrode tends to reduce the effects of lower sheet resistance $R_{S1}$ near the edge of the electrode. Preferably, the thickness profile of resistive layer 104 is optimized to provide substantially equivalent resistive paths across the electrode surface. This is not as simple as making $R_{C2}+R_{S2}+$ $R_{S1}=R_{C1}+R_{S1}$ since the current flowing along conductive layer 102 decreases toward the center of the electrode, due to current flow across resistive layer 104. The thickness profile of resistive layer 104 may be optimized by analyzing an equivalent circuit comprising cross-film resistance elements for resistive layer 104 in series with parallel sheet resistance elements for conductive layer 102. This analysis is greatly simplified by assuming a uniform current distribution and adjusting the thickness profile of resistive layer 104 to compensate for sheet resistance effects at each point along the electrode surface. Preferably, the various electrode layers are refractive index matched to minimize detrimental optical effects.

Conductive layer 102 of FIG. 1 may comprise any material exhibiting sufficient conductivity, optical transparency and chemical stability for the intended application. The conductive layer is preferably a doped metallic oxide, for example, indium tin oxide (ITO), fluorine-doped tin oxide (FTO), aluminum-doped zinc oxide, antimony-doped tin oxide, fluorine-doped indium oxide, aluminum-doped tin oxide, phosphorus-doped tin oxide, or indium zinc oxide. Resistive layers 103 and 104 may comprise any material exhibiting sufficient resistivity, optical transparency, and chemical stability for the intended application. Preferably, the resistive layer material is a wide-bandgap metallic oxide with high chemical stability, magnesium oxide (MgO), yttria (Y2O3), zirconia (ZrO2), alumina (Al2O3), indium oxide (In2O3), titania (TiO2), stannic oxide (SnO2) or zinc oxide (ZnO), for example. Silicon oxide and germanium oxide may also be used as resistive layers. Non-stoichiometric oxides and mixed oxides involving two or more metals may be used for the resistive layer but are less preferred since they tend to be more conductive than stoichiometric oxides of a single metal. The transparent substrate may comprise any suitable glass, soda lime glass, for example, or any suitable plastic, polycarbonate, for example. Electrical contact is generally provided along at least one side of the electrode by bus bars, comprising conducting epoxy, metallic strips with conducting adhesive, or metallic clips, for example.

Figure 2:
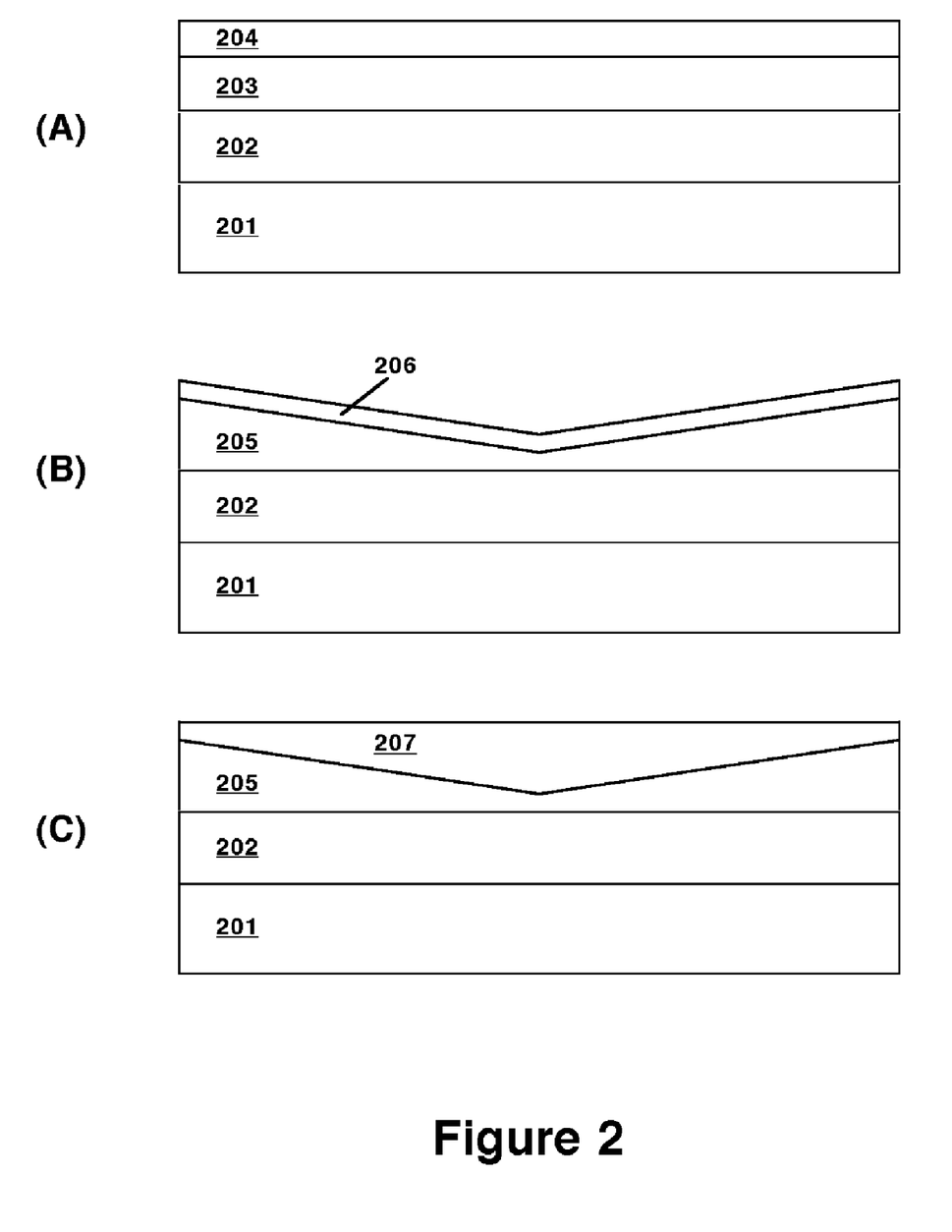
FIG. 2 shows schematic cross sections of electrodes having (A) a uniform resistive innerlayer and a uniform surface modification layer, (B) a graded resistive innerlayer and a uniform surface modification layer, and (C) a graded resistive layer and a graded surface modification layer.

FIG. 2(A) depicts an electrode, according to the invention, comprising a transparent substrate 201, a transparent conductive layer 202, a transparent resistive innerlayer 203 of uniform thickness, and a uniform surface modification layer 204 deposited on resistive layer 203. Surface modification layer 204 is intended to provide a desirable chemical or electrochemical property not possessed by the resistive innerlayer material. For example, a surface modification layer of ITO on a resistive innerlayer of a wide-bandgap metallic oxide is typically used to provide the optimum density of electrodeposited Pt spheroids for a REM dot matrix counter electrode. For a REM mirror electrode, two surface modification layers, an ITO layer and a Pt overlayer, are typically used on a resistive innerlayer of a wide-bandgap metallic oxide. The Pt overlayer serves as a nucleation layer, needed to provide mirror electrodeposits. Various types of surface modification layers may be used, depending on the type of optical modulation device. One or more surface modification layers may play an active role in optical modulation. For example, a surface modification layer may comprise an organic material that emits light in an organic light emitting diode (OLED) device. As depicted in FIG. 2(B) and 2(C), respectively, a surface modification layer used on a graded resistive layer 205 may be a layer 206 of uniform thickness or a layer 207 of graded thickness. A graded surface modification layer may be used to provide desirable optical characteristics.

Figure 3:
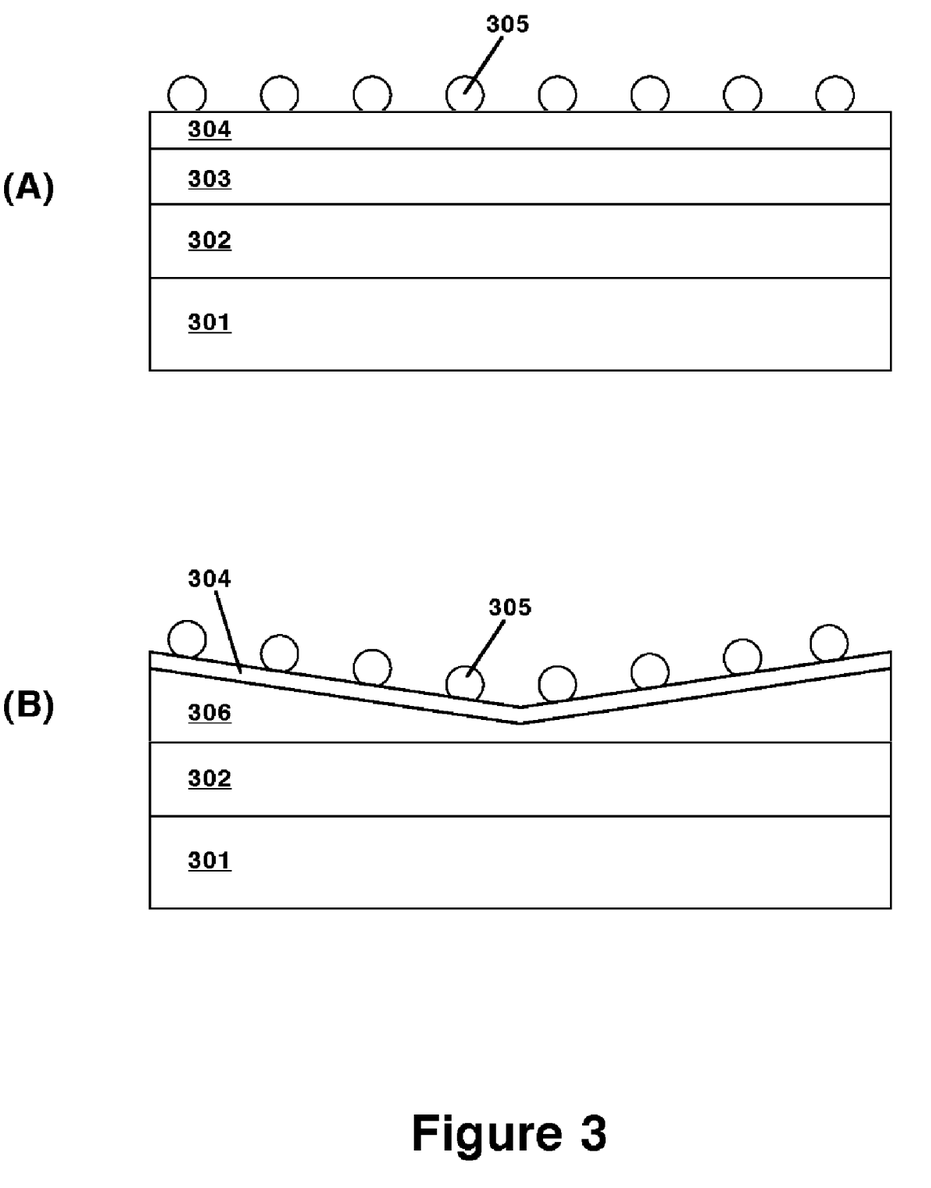
FIG. 3 shows schematic cross sections of a REM dot matrix electrode with: (A) a uniform resistive innerlayer and a uniform surface modification layer; and (B) a graded resistive innerlayer and uniform surface modification layer.

FIG. 3(A) depicts a REM dot matrix electrode, according to the invention, comprising a transparent substrate 301, a transparent conductive layer 302, a transparent resistive innerlayer 303 of uniform thickness, a first surface modification layer 304 of uniform thickness, and a second surface modification layer comprising spheroids 305 of an inert metal. FIG. 3(B) depicts a REM dot matrix electrode analogous to that depicted in FIG. 3(A) except that transparent resistive innerlayer 306 is graded in thickness. Transparent substrate 301 may comprise any suitable transparent glass or plastic material. Conductive layer 302 and surface modification layer 304 preferably comprise a doped metallic oxide, indium tin oxide (ITO) or fluorine-doped tin oxide (FTO), for example. Conductive layer 302 preferably has relatively low sheet resistance (10-20 ohms/square). Surface modification layer 304 is preferably relatively thin (100-500 Å thick) so as to have relatively high sheet resistance (100-500 ohms/square). Resistive layers 303 and 306 preferably comprise a wide-bandgap metallic oxide with high chemical stability, magnesium oxide (MgO), yttrium oxide ($Y_2O_3$), zirconium oxide ($ZrO_2$), aluminum oxide ($Al_2O_3$), indium oxide ($In_2O_3$), titanium oxide ($TiO_2$), stannic oxide ($SnO_2$), silicon oxide ($SiO_2$), germanium oxide ($GeO_2$) or zinc oxide (ZnO), for example. Spheroids 305 preferably comprise an inert metal selected from the group consisting of platinum, iridium, gold, osmium, palladium, rhenium, rhodium, ruthenium, and alloys thereof. Fabrication of dot matrix electrodes (without the resistive layer of the invention) is described in U.S. patent application Ser. No. 10/211,494, filed Aug. 1, 2002 (entitled "Locally-Distributed Electrode and Method of Fabrication"). Spheroids 305 are preferably 0.1-5 μm in diameter and have a density of 1-3 million/cm$^2$ provided by electrodeposition from an alkaline Pt plating bath (pH 11-12) at a potential less negative than −0.6 V vs. saturated calomel electrode (SCE).

Figure 4:
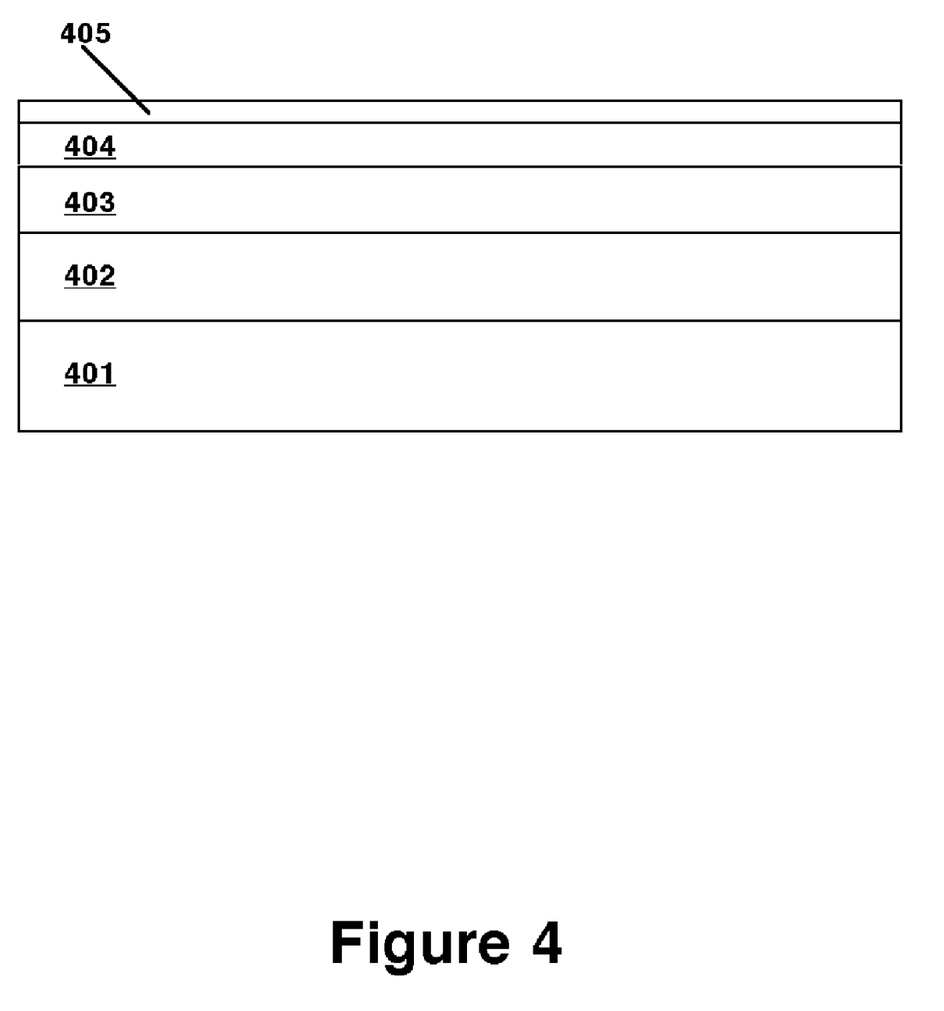
FIG. 4 shows schematic cross sections of a REM mirror electrode with a resistive innerlayer, a conductive overlayer and a nucleation layer.

FIG. 4 depicts a REM mirror electrode, according to the invention, comprising a transparent substrate 401, a transparent conductive layer 402, a transparent resistive innerlayer 403, a first surface modification layer 404, and a second surface modification layer 405. Transparent substrate 401 may comprise any suitable transparent glass or plastic material. Conductive layer 402 and first surface modification layer 404 preferably comprise a doped metallic oxide, indium tin oxide (ITO) or fluorine-doped tin oxide (FTO), for example. Conductive layer 402 preferably has relatively low sheet resistance (10-20 ohms/square). First surface modification layer 404 is preferably relatively thin (100-500 Å thick) so as to have relatively high sheet resistance (100-500 ohms/square). Resistive layer 403 preferably comprises a wide-bandgap metallic oxide with high chemical stability, magnesium oxide (MgO), yttrium oxide ($Y_2O_3$), zirconium oxide ($ZrO_2$), aluminum oxide ($Al_2O_3$), indium oxide ($In_2O_3$), titanium oxide ($TiO_2$), stannic oxide ($SnO_2$), silicon oxide ($SiO_2$), germanium oxide ($GeO_2$) or zinc oxide (ZnO), for example. Second surface modification layer 405, which is a nucleation layer, preferably comprises a thin layer (15-25 Å thick) of an inert metal selected from the group consisting of platinum, iridium, gold, osmium, palladium, rhenium, rhodium, ruthenium, and alloys thereof. The thicknesses of transparent resistive innerlayer 403 and first surface modification layer 404 may be uniform or graded.

Figure 5:
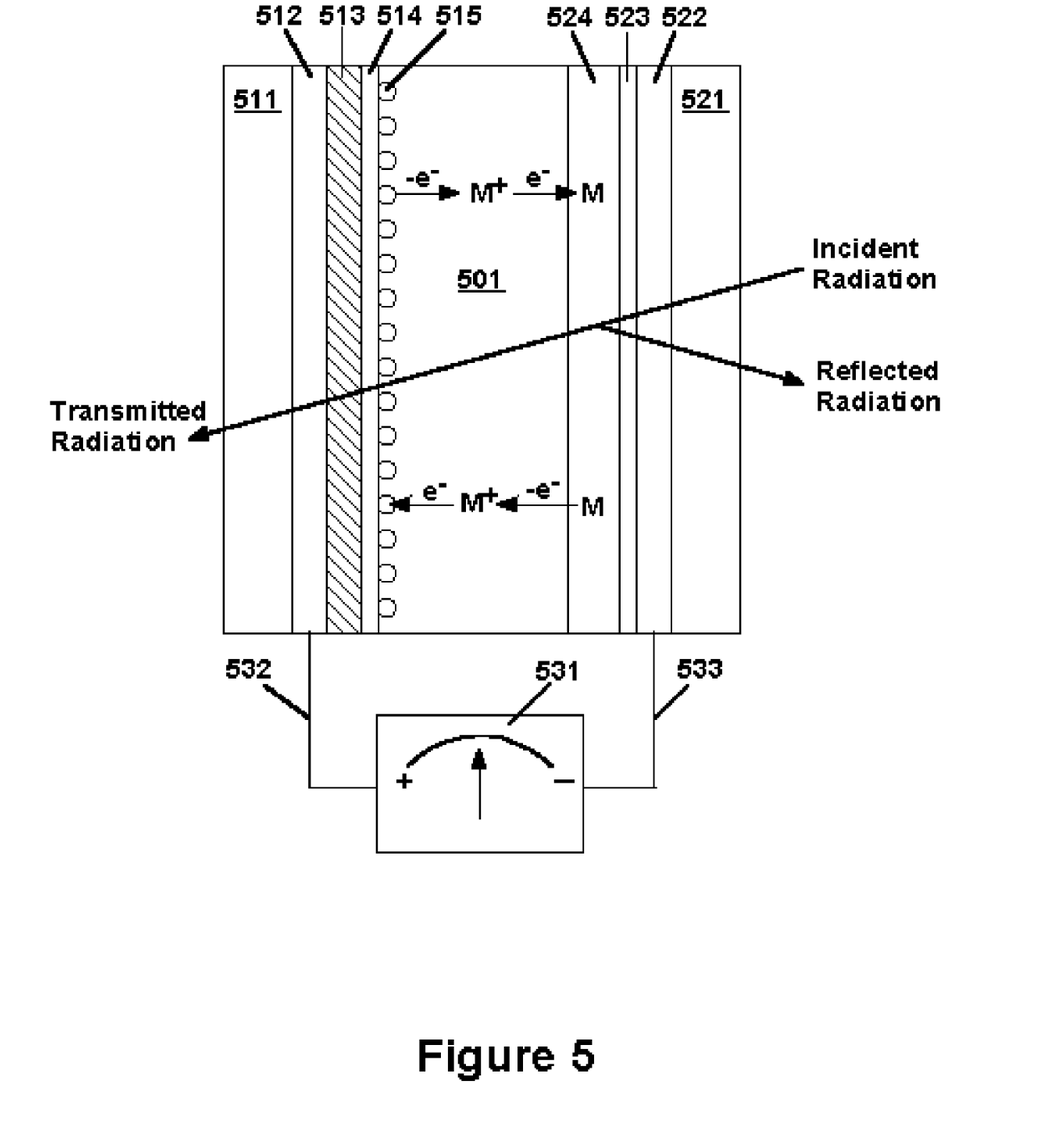
FIG. 5 shows a schematic cross-section of a REM smart window device employing a dot matrix counter electrode with a resistive innerlayer according to the invention.

FIG. 5 depicts a REM smart window device employing a dot matrix counter electrode with a resistive innerlayer according to the invention. Both electrodes of the device comprise transparent conductive layers (512 and 522) deposited on transparent substrates (511 and 521). The dot matrix electrode further comprises transparent resistive innerlayer 513, surface modification layer 514, and a dot matrix of noble metal spheroids 515. The mirror electrode further comprises nucleation layer 523 (preferably 15-25 Å Pt) and a layer 524 of an electrodepositable metal (preferably Ag, Cu, Bi, or an alloy thereof). The charge of the electrodepositable metal comprising layer 524 could initially reside on the spheroids of the dot matrix electrode, or be distributed between the two electrodes. Electrolyte 501 comprising ions of the electrodepositable metal subsists between and in electrical contact with the two electrodes. Layer 524 of the electrodeposited metal tends to reflect incident electromagnetic radiation.

Application of a positive voltage to the mirror electrode relative to the dot matrix electrode via power source 531 and wire leads 532 and 533 tends to cause the electrodepositable metal to dissolve from layer 524 on the mirror electrode and to deposit on the spheroids comprising the dot matrix electrode. This tends to decrease the amount of reflected radiation and increase the amount of transmitted radiation. Application of a negative voltage to the mirror electrode tends to cause the electrodepositable metal to deposit on layer 524 of the dot matrix electrode and to dissolve from noble metal spheroids 515 of the dot matrix electrode, increasing the amount of reflected radiation and decreasing the amount of transmitted radiation. Voltage losses associated with the sheet resistances of conductive layers 512 and 522 tend to reduce the inter-electrode voltage at locations away from the buss bars at the electrode edges, resulting in thinner mirror layers and reduced optical reflectance toward the center of the device. This effect is reduced by the cross-film resistance of the resistive innerlayer, which is electrically in series with the constituent elements of the electrode sheet resistances.

Figure 6:
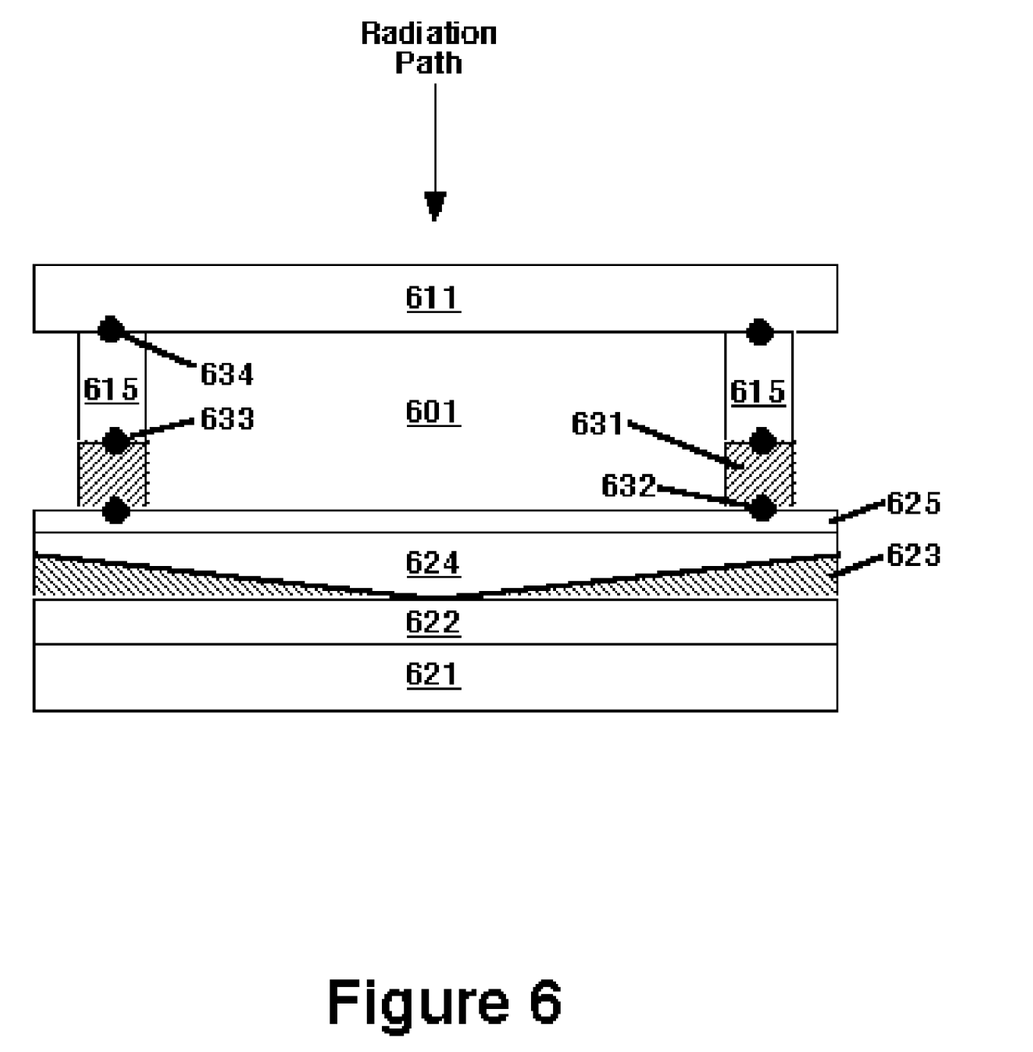
FIG. 6 shows a schematic cross-section of a REM optical modulation device with a counter electrode outside the optical path and a mirror electrode with a resistive innerlayer according to the invention.

FIG. 6 depicts a REM optical shutter device having a circular cross section and employing a mirror electrode with a resistive innerlayer according to the invention. Electrolyte 601 comprises ions of an electrodepositable metal (e.g., Ag, Cu or Bi) and may be aqueous, nonaqueous or an ionic liquid. Electrolyte 601 is contained within a cavity defined by transparent insulating disk 611, metallic counter electrode ring 615, insulating ring 631, O-rings 632, 633 and 634, and a mirror electrode comprising nucleation layer 625, surface modification layer 624, transparent resistive layer 623, transparent conductive layer 622, and transparent substrate 621. Insulating disk 611 and substrate 621 may comprise any suitable transparent glass or plastic material. Insulating ring 631 preferably comprises a plastic material but may comprise any insulating material that is compatible with electrolyte 601. O-rings 632, 633 and 634 may comprise any suitable material. Counter electrode ring 615 preferably consists of the electrodepositable metal, or an electrochemically inert metal with a coating of the electrodepositable metal. The mirror electrode layers are the same as those described for FIG. 4.

For the REM shutter device of FIG. 6, device transmission is decreased via deposition of a mirror layer of the electrodepositable metal on nucleation layer 625 of the mirror electrode, and is increased via deposition of the electrodepositable metal on counter electrode ring 615. Counter electrode ring 615 is located outside the incident radiation path, which optimizes the maximum device transmission, but tends to provide nonuniform mirror electrode deposits. Resistive layer 625, which is preferably graded in thickness (as shown), tends to improve the uniformity of mirror electrode deposits. Surface modification layer 624 may also be graded (as shown).

Fabrication of a Preferred Embodiment

The feasibility of improving the switching uniformity of optical modulation devices via a transparent resistive layer was demonstrated for REM dot matrix electrodes and REM mirror electrodes. Resistive layers of $Al_2O_3$, $SnO_2$, $TiO_2$ and ZnO of various thicknesses were deposited on conductive ITO layers (20 ohms/square) via magnetron sputtering using metallic targets, a mixture of oxygen and argon at a total chamber pressure of 2-3 mtorr, and a substrate temperature of approximately 100° C. A surface modification layer of ITO (100 ohms/square) was deposited on each of the resistive layers by magnetron sputtering using a ceramic target. All of these specimens appeared transparent to the eye. A thin platinum nucleation layer (25 Å thick) was sputtered onto the surface modification layers of some specimens of each type.

EXAMPLE 1

The electrode resistance increase associated with the sputtered ZnO, $SnO_2$, $TiO_2$ and $Al_2O_3$ innerlayers (sandwiched between an 20-ohm ITO underlayer and a 100-ohm ITO/Pt overlayer) was determined by cyclic voltammetry at 50 mV/s between −0.1 and +0.2 V vs. Ag wire reference electrode in a deaerated electrolyte suitable for REM devices (1.5 M AgI and 2.0 M LiBr in gamma-butyrolactone solvent). Electrode resistance was determined from the voltammetric slopes in the cathodic region since those in the anodic region tended to be more variable and somewhat lower, presumably due to greater concentration polarization. Table 1 summarizes the data for the total electrode resistance and the innerlayer resistance (total resistance minus the resistance measured for the ITO/Pt substrate). The values given are the average of two measurements, which generally yielded comparable results. The highest innerlayer resistance (around 300 ohms/cm$^2$) was attained with the thicker $TiO_2$ and $Al_2O_3$ innerlayers. These results demonstrate the feasibility of attaining high cross-layer resistance with relatively thin layers of transparent wide-bandgap metallic oxides. Silver electrodeposited from the gamma-butyrolactone electrolyte on platinized specimens with resistive innerlayers had a mirror appearance, indicating that the resistive innerlayers did not adversely affect mirror formation.

TABLE 1

Resistive Innerlayer Resistance Data

| Inner Layer | Thickness (Å) | Average Resistance (ohm/cm$^2$) | |
|---|---|---|---|
| | | Total | Inner Layer |
| None (20-ohm ITO/Pt) | | 71 | |
| ZnO | 300 | 112 | 40 |
| ZnO | 1000 | 117 | 46 |
| ZnO | 3000 | 146 | 75 |
| $SnO_2$ | 230 | 77 | 6 |
| $SnO_2$ | 470 | 96 | 24 |
| $SnO_2$ | 700 | 114 | 43 |
| $SnO_2$ | 1400 | 154 | 82 |
| $TiO_2$ | 500 | 131 | 60 |
| $TiO_2$ | 1000 | 207 | 136 |
| $TiO_2$ | 3000 | 349 | 278 |
| $Al_2O_3$ | 300 | 260 | 188 |
| $Al_2O_3$ | 2500 | 432 | 361 |

EXAMPLE 2

The densities and diameters of Pt spheroids obtained after plating for 5 minutes at −0.45 V vs. SCE from a commercial Pt plating bath (Technic, Inc., Platinum-A bath) operated at pH 11.5 and 80° C. were determined from scanning electron micrographs for ITO/SnO$_2$ specimens, with and without an ITO overlayer. Plating on 10-20 ohm/square ITO films without resistive innerlayers under the same conditions consistently gave 1-3 million spheroids/cm$^2$ with diameters of 1.2-1.3 μm. Plating directly on the thin SnO$_2$ layers gave very low Pt spheroid densities. In all cases, plating on the specimens with ITO surface modifications on SnO$_2$ innerlayers gave Pt spheroid diameters and densities within the ranges obtained for specimens without the resistive innerlayers, indicating that the electrochemical properties of sputtered ITO were not affected by the resistive innerlayers.

The preferred embodiments of the present invention have been illustrated and described above. Modifications and additional embodiments, however, will undoubtedly be apparent to those skilled in the art. Furthermore, equivalent elements may be substituted for those illustrated and described herein, parts or connections might be reversed or otherwise interchanged, and certain features of the invention may be utilized independently of other features. Consequently, the exemplary embodiments should be considered illustrative, rather than inclusive, while the appended claims are more indicative of the full scope of the invention.

What is claimed is:

1. An electrode for improving the switching uniformity of an optical modulation device, comprising:
   a layer of a transparent conductive material deposited on a transparent substrate;
   a layer of a transparent resistive material deposited on the layer of the transparent conductive material, wherein said transparent resistive material is a stoichiometric oxide of a single metal; and
   a first surface modification layer deposited on the layer of the transparent resistive material.

2. The electrode of claim 1, wherein the optical modulation device is based on a technology selected from the group consisting of reversible electrodeposition, electrochromic, organic light emitting diode, suspended particle, and liquid crystal.

3. The electrode of claim 1, wherein the transparent conductive material is a doped metallic oxide selected from the group consisting of indium tin oxide, fluorine-doped tin oxide, aluminum-doped zinc oxide, antimony-doped tin oxide, fluorine-doped indium oxide, aluminum-doped tin oxide, phosphorus-doped tin oxide, and indium zinc oxide.

4. The electrode of claim 1, wherein the transparent substrate comprises a material selected from the group consisting of glasses and plastics.

5. The electrode of claim 1, wherein the transparent resistive material is a wide-bandgap metallic oxide.

6. The electrode of claim 5, wherein the wide-bandgap metallic oxide is selected from the group consisting of magnesium oxide, yttrium oxide, zirconium oxide, aluminum oxide, indium oxide, titanium oxide, stannic oxide, silicon oxide, germanium oxide, zinc oxide, and mixtures thereof.

7. The electrode of claim 1, further comprising: a second surface modification layer deposited on the first surface modification layer and comprising a noble metal selected from the group consisting of platinum, iridium, gold, osmium, palladium, rhenium, rhodium, ruthenium, and alloys thereof.

8. An electrode for improving the switching uniformity of an optical modulation device, comprising:
   a layer of a transparent conductive material deposited on a transparent substrate;
   a layer of a transparent resistive material deposited on the layer of the transparent conductive material; and
   a first surface modification layer deposited on the layer of the transparent resistive material;
   wherein the layer of the transparent resistive material is graded in thickness.

9. An electrode for improving the switching uniformity of an optical modulation device, comprising:
   a layer of a transparent conductive material deposited on a transparent substrate;
   a layer of a transparent resistive material deposited on the layer of the transparent conductive material; and
   a first surface modification layer deposited on the layer of the transparent resistive material;
   wherein the layer of the transparent resistive material is graded in composition.

10. An electrode for improving the switching uniformity of an optical modulation device, comprising:
    a layer of a transparent conductive material deposited on a transparent substrate;
    a layer of a transparent resistive material deposited on the layer of the transparent conductive material; and
    a first surface modification layer deposited on the layer of the transparent resistive material;
    wherein the first surface modification layer comprises a doped metallic oxide selected from the group consisting of indium tin oxide, fluorine-doped tin oxide, aluminum-doped zinc oxide, antimony-doped tin oxide, fluorine-doped indium oxide, aluminum-doped tin oxide, phosphorus-doped tin oxide, and indium zinc oxide.

11. An electrode for improving the switching uniformity of an optical modulation device, comprising:
    a layer of a transparent conductive material deposited on a transparent substrate;
    a layer of a transparent resistive material deposited on the layer of the transparent conductive material;
    a first surface modification layer deposited on the layer of the transparent resistive material; and
    a dot matrix of spheroids of a noble metal deposited on the first surface modification layer.

12. The electrode of claim 11, wherein the noble metal is selected from the group consisting of platinum, iridium, gold, osmium, palladium, rhenium, rhodium, ruthenium, and alloys thereof.

13. A reversible electrochemical mirror optical modulation device with improved switching uniformity, comprising:
    a counter electrode comprising a dot matrix of spheroids of a first noble metal deposited on a surface modification layer of a first transparent conductive material, which is deposited on a resistive layer of a transparent resistive material, which is deposited on a conductive layer of a second transparent conductive material, which is deposited on a first transparent substrate;
    a mirror electrode comprising a nucleation layer of a second noble metal deposited on a layer of a third transparent conductive material, which is deposited on a second transparent substrate;
    an electrolyte comprising ions of an electrodepositable metal; and
    a charge of the electrodepositable metal subsisting on at least one of said electrodes, whereby the electrodepositable metal is reversibly electrodeposited on said mirror electrode and on said counter electrode so as to affect propagation of electromagnetic radiation.

14. The device of claim 13, wherein the first and second noble metals are selected form the group consisting of platinum, iridium, gold, osmium, palladium, rhenium, rhodium, ruthenium, and alloys thereof.

15. The device of claim 13, wherein the first, second and third transparent conductive materials are doped metallic oxides selected from the group consisting of indium tin oxide, fluorine-doped tin oxide, aluminum-doped zinc oxide, antimony-doped tin oxide, fluorine-doped indium oxide, aluminum-doped tin oxide, phosphorus-doped tin oxide, and indium zinc oxide.

16. The device of claim 13, wherein the transparent resistive material is a wide-bandgap metallic oxide.

17. The device of claim 16, wherein the wide-bandgap metallic oxide is selected from the group consisting of magnesium oxide, yttrium oxide, zirconium oxide, aluminum oxide, indium oxide, titanium oxide, stannic oxide, silicon oxide, germanium oxide, zinc oxide, and mixtures thereof.

18. The device of claim 13, wherein the first and second transparent substrates comprise materials selected from the group consisting of glasses and plastics.

19. The device of claim 13, wherein the resistive layer of the transparent resistive material is graded in thickness.

20. The electrode of claim 13, wherein the resistive layer of the transparent resistive material is graded in composition.

21. The device of claim 13, wherein said electrolyte is selected from the group consisting of aqueous solution, nonaqueous solution, and ionic liquid.

22. The device of claim 13, wherein the electrodepositable metal is selected from the group consisting of silver, bismuth, copper, tin, cadmium, mercury, indium, lead, antimony, thallium, zinc, and alloys thereof.

23. A reversible electrochemical mirror optical modulation device with improved switching uniformity, comprising:
a mirror electrode comprising a nucleation layer of a first noble metal deposited on a surface modification layer of a first transparent conductive material, which is deposited on a resistive layer of a transparent resistive material, which is deposited on a conductive layer of a second transparent conductive material, which is deposited on a first transparent substrate;
a counter electrode comprising a dot matrix of spheroids of a second noble metal deposited on a layer of a third transparent conductive material;
an electrolyte comprising ions of an electrodepositable metal; and
a charge of the electrodepositable metal subsisting on at least one of said electrodes, whereby the electrodepositable metal is reversibly electrodeposited on said mirror electrode and on said counter electrode so as to affect propagation of electromagnetic radiation.

24. The device of claim 23, wherein the first and second noble metals are selected form the group consisting of platinum, iridium, gold, osmium, palladium, rhenium, rhodium, ruthenium, and alloys thereof.

25. The device of claim 23, wherein the first, second and third transparent conductive materials are doped metallic oxides selected from the group consisting of indium tin oxide, fluorine-doped tin oxide, aluminum-doped zinc oxide, antimony-doped tin oxide, fluorine-doped indium oxide, aluminum-doped tin oxide, phosphorus-doped tin oxide, and indium zinc oxide.

26. The device of claim 23, wherein the transparent resistive material is a wide-bandgap metallic oxide.

27. The device of claim 26, wherein the wide-bandgap metallic oxide is selected from the group consisting of magnesium oxide, yttrium oxide, zirconium oxide, aluminum oxide, indium oxide, titanium oxide, stannic oxide, silicon oxide, germanium oxide, zinc oxide, and mixtures thereof.

28. The device of claim 23, wherein the first and second transparent substrates comprise materials selected from the group consisting of glasses and plastics.

29. The device of claim 23, wherein the resistive layer of the transparent resistive material is graded in thickness.

30. The electrode of claim 23, wherein the resistive layer of the transparent resistive material is graded in composition.

31. The device of claim 23, wherein said electrolyte is selected from the group consisting of aqueous solution, nonaqueous solution, and ionic liquid.

32. The device of claim 23, wherein the electrodepositable metal is selected from the group consisting of silver, bismuth, copper, tin, cadmium, mercury, indium, lead, antimony, thallium, zinc, and alloys thereof.

* * * * *